(No Model.)
O. TABER.
SADDLE TREE.
No. 480,221. Patented Aug. 2, 1892.
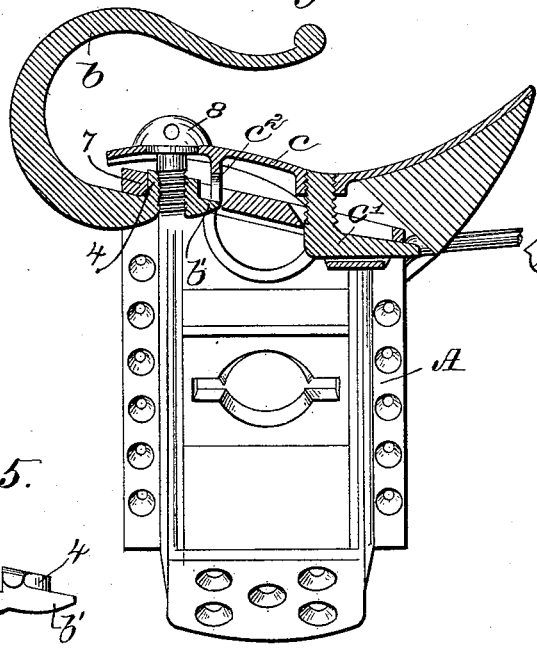
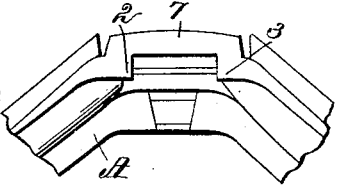
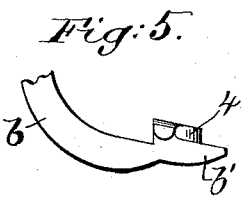
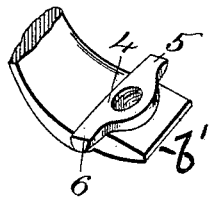
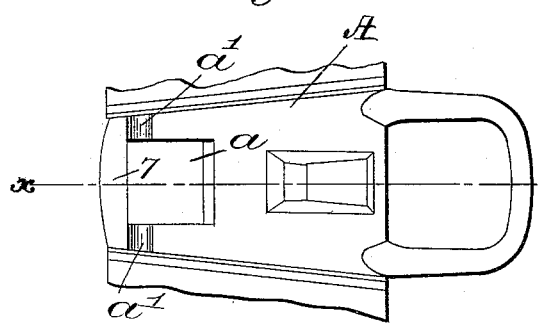
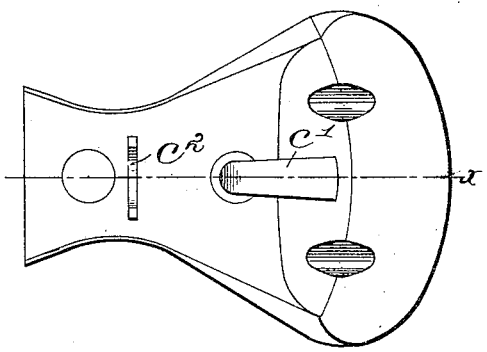
Witnesses.
Edward F. Allen
Frederick L. Emery
Inventor
Orrin Taber
By Crosby & Gregory
Attys.

UNITED STATES PATENT OFFICE.

ORRIN TABER, OF NASHUA, NEW HAMPSHIRE, ASSIGNOR TO THE NASHUA SADDLERY HARDWARE COMPANY, OF SAME PLACE.

SADDLE-TREE.

SPECIFICATION forming part of Letters Patent No. 480,221, dated August 2, 1892.

Application filed January 15, 1892. Serial No. 418,166. (No model.)

*To all whom it may concern:*

Be it known that I, ORRIN TABER, of Nashua, county of Hillsborough, State of New Hampshire, have invented an Improvement in Saddle-Trees, of which the following description, in connection with the accompanying drawings, is a specification, like letters and figures on the drawings representing like parts.

This invention relates to saddle-trees, and has for its object to so construct the parts thereof that the pull or strain upon the hook will be brought upon and so as to be resisted by the tree instead of the usual screw or other fastening employed to secure the hook in position.

In accordance with this invention a hole or recess is formed in the tree, and a shoulder or other projecting portion is formed on the hook, which is adapted to bear against one side wall of said hole or recess in the tree which presents an abutment for it.

To facilitate assembling the parts, the hole in the tree is made completely through the tree, and the hook has formed on it in addition to the shoulder suitable oppositely-projecting lugs, and said hook is passed tip foremost down through said hole in the tree until the lugs enter recesses made to receive them. The hook is then turned into proper operative position, the lugs serving at such times as trunnions or pivots. When said hook is brought into proper position the shank thereof next the shoulder will be brought to bear against the under side of the tree, and by reason of the lugs bearing upon the opposite side of the tree the hook will thus be brought into a position of rest. Suitable means are provided for holding the hook in this position.

Figure 1 shows in vertical section a saddle-tree provided with a hook and seat embodying this invention; Fig. 2, a plan view of the apex portion of the tree; Fig. 3, an edge view of the apex portion of the left-hand side of the tree shown in Fig. 1; Fig. 4, a detail showing the rear end portion of the checkrein-hook; Fig. 5, a side view of the checkrein-hook, and Fig. 6 an under side view of the seat.

The tree A, for the most part made as usual, has a hole $a$ through it at the apex thereof, herein shown as quadrangular in shape, (see Fig. 2,) and on the top side of the tree at each side of said hole $a$ a small transverse recess $a'$ is formed. The under side of the tree A at the end thereof is provided with two shoulders 2 3 opposite each other. (See Fig. 3.) The checkrein-hook $b$, for the most part of usual construction and shape, has its rear end $b'$ made of substantially the same width as the width of the hole $a$, and said end is cut away or formed to present the shoulder 4. Lugs 5 6 are formed on each side of the rear end $b'$ of the hook adjacent the shoulder 4, one side of said lugs forming continuations of said shoulder. The checkrein-hook, formed in this manner, is passed tip foremost through the hole $a$ until the lugs 5 6 enter the recesses $a'$ $a'$, at which time the said hook will be turned on the lugs 5 6 as trunnions or pivots until the top of the shank of the hook adjacent the shoulder 4 is brought to bear against the under side of the tree at 7, at which time further movement of the hook is prevented by reason of the lugs 5 6 bearing upon the top of the tree and the shank adjacent the shoulder 4 bearing against the under side of the tree. When the hook has been thus placed in position, it will be seen that when a strain or direct pull is brought upon it the shoulder 4 will bear against the side wall or portion 7 of the tree, which serves as an abutment therefor and which will effectually resist such strain. The end $b'$ of the hook will occupy a position in the hole $a$ when said hook is thus brought into operative position, and the shank of the hook next the shoulder 4 will enter a recess between the shoulders 2 3, and hence the side walls of the hole $a$, against which the sides of the end $b'$ bear, and the shoulders 2 3, against which the shank of the hook bears, as well as the side walls of the recesses $a'$ $a'$, against which the lugs 5 6 bear, all act to prevent the hook from swerving in either direction. The seat $c$ has secured to its under side a hook $c'$, which enters another hole, or it may be a mortise in the tree A, the forward end of said hook passing through a suitable rear opening thereof. A leg $c^2$ is formed integral with or secured to the under side of the seat $c$ in such position as to enter the hole $a$ and bear upon the rear end of the end portion $b'$ of the hook to prevent the hook from rocking on the lugs 5 6 as trunnions or pivots. The screw 8 passes down through the seat $c$ and into a screw-threaded hole in the end $b'$ of the hook, thereby securing the hook and seat together. The screw 8, it will be seen, serves simply as a fastening to hold the forward end of the seat in position and assist in keeping the hook from rocking, as described. The pull or strain upon the hook, it will be seen, is not brought upon the screw 8, but upon the abutment 7 of the tree.

I claim—

1. The checkrein-hook having a shoulder or other projecting portion provided with oppositely-extended lugs combined with the tree having a hole or recess, one side wall of which presents an abutment against which the said shoulder or other projection bears and transverse recesses to receive the lugs, a seat having a depending leg which bears upon the rear end of the hook, and a screw which connects the seat and hook together, substantially as described.

2. The checkrein-hook having a shoulder or other projecting portion provided with oppositely-extended lugs, combined with the tree having a hole or recess, one side wall of which presents an abutment against which the said shoulder or other projecting portion bears, said tree also having two shoulders 2 3, which receive between them the shank of the hook, and recessed bearings for the lugs on the hook, substantially as described.

3. The tree having a hole through it and transverse recesses $a'$ $a'$, combined with a checkrein-hook adapted to pass through said hole and provided with oppositely-projecting lugs 5 6, which are supported in said recesses, and means to connect the hook to the seat, substantially as described.

4. The tree having a hole through it and transverse recesses $a'$ $a'$, combined with the checkrein-hook adapted to pass through the said hole and provided with oppositely-projecting lugs 5 6, which are supported in said recesses, and a seat having on its under side a projection which bears upon the end of the hook, and a screw connecting the seat and hook together and thereby securing them to the tree, substantially as described.

5. The tree having a hole $a$ through it and recesses $a'$ $a'$, combined with a checkrein-hook having a rear end portion $b'$, which occupies a position in said hole $a$, and the oppositely-projecting lugs 5 6, which enter said recesses $a'$ $a'$, and a shoulder 4, which bears against one side wall of said hole $a$, the seat $c$, and screw connecting the seat and tree, substantially as described.

In testimony whereof I have signed my name to this specification in the presence of two subscribing witnesses.

ORRIN TABER.

Witnesses:
BERNICE J. NOYES,
FRANCES M. NOBLE.